United States Patent
Duleba et al.

(10) Patent No.: US 9,305,102 B2
(45) Date of Patent: Apr. 5, 2016

(54) SYSTEMS AND METHODS FOR PROVIDING PERSONALIZED SEARCH RESULTS BASED ON PRIOR USER INTERACTIONS

(71) Applicant: GOOGLE Inc., Mountain View, CA (US)

(72) Inventors: Krzysztof Duleba, Pfaffikon SZ (CH); Maciej Szymon Nowakowski, Zurich (CH)

(73) Assignee: GOOGLE INC., Mountain View, CA (US)

( * ) Notice: Subject to any disclaimer, the term of this patent is extended or adjusted under 35 U.S.C. 154(b) by 276 days.

(21) Appl. No.: 13/778,625

(22) Filed: Feb. 27, 2013

(65) Prior Publication Data
US 2014/0244634 A1 Aug. 28, 2014

(51) Int. Cl.
G06F 7/00 (2006.01)
G06F 17/30 (2006.01)

(52) U.S. Cl.
CPC ...... *G06F 17/3087* (2013.01); *G06F 17/30864* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 6,321,228 B1 * | 11/2001 | Crandall | G06F 17/30864 |
| 6,564,213 B1 | 5/2003 | Ortega | |
| 6,832,218 B1 * | 12/2004 | Emens | G06F 17/30867 |
| 6,873,982 B1 * | 3/2005 | Bates | G06F 17/30648 |
| | | | 707/737 |
| 7,895,221 B2 | 2/2011 | Colledge et al. | |
| 7,917,490 B2 | 3/2011 | Norris et al. | |
| 8,005,842 B1 | 8/2011 | Pasca et al. | |
| 8,156,099 B2 | 4/2012 | Norris et al. | |
| 8,510,262 B2 * | 8/2013 | Aggarwal | G06F 17/30241 |
| | | | 707/603 |
| 2005/0080776 A1 | 4/2005 | Colledge et al. | |
| 2006/0085392 A1 * | 4/2006 | Wang | G06F 17/3087 |
| 2007/0136259 A1 * | 6/2007 | Dorfman et al. | 707/3 |
| 2008/0120276 A1 | 5/2008 | Chennavasin | |
| 2010/0174703 A1 | 7/2010 | Danekar et al. | |
| 2010/0191797 A1 | 7/2010 | Seefeld et al. | |
| 2011/0202522 A1 | 8/2011 | Ciemiewicz et al. | |
| 2013/0018685 A1 * | 1/2013 | Parnaby et al. | 705/7.13 |

OTHER PUBLICATIONS

Hansen et al., "Integrating the Web and the World: Contextual Trails on the Move", HT'04, pp. 98-107, 2004, ACM.*
'Google Chrome Blog: Tip: Opening Links in New Tabs', http://chrome.blogspot.nl/2009/08/tip-opening-links-in-new-tabs.html, Aug. 11, 2009, pp. 1-2.

(Continued)

Primary Examiner — Michael Hicks
(74) Attorney, Agent, or Firm — Marshall, Gerstein & Borun LLP

(57) ABSTRACT

Embodiments include a computer-implemented method that includes receiving, from a user, a plurality of search queries, receiving, from the user, a plurality of search refinements associated with the plurality of search queries (the search refinements resulting in the display of a plurality of refined results to the user) mapping one of the plurality of search queries to one of the refined results, receiving, from the user, the one of the plurality of search queries mapped to one of the refined results, and, in response to receiving the one of the plurality of search queries mapped to one of the refined results, providing, for display to the user, refined content corresponding to the one of the refined results mapped to the one of the plurality of search queries received from the user.

19 Claims, 7 Drawing Sheets

(56) References Cited

OTHER PUBLICATIONS

'Google Just Killed the "I'm Feeling Lucky Button"—Business Insider', Business Insider Online, http://www.businessinsider.com/google-just-effectively-killed-the-im-feeling-lucky-button-2010-9, Sep. 8, 2010, pp. 1-1.

International Search Report & Written Opinion for PCT App. No. PCT/US2014/018003, mailed May 9, 2014. (pp. 1-16).

'Location-Based Search Engines Tasks and Capabilities: A Comparative Study', http://www.webology.org/2007/v4n4/a48.htm, Dec. 27, 2007, pp. 1-14.

'New Google Feature Provides Previews of Web Search Results', http://blogs.inquirer.net/techaddicts/2810/11/11/new-google-feature-provides-previews-of-web-search-results/, Nov. 11, 2010, pp. 1-4.

\* cited by examiner

| Serach Query Refinement Log for "John Doe" ||||
|---|---|---|---|
| Search Query | Refined Result | No. of Occ. | % |
| Map Search + "Arglington" | Map Search + "Arglington Texas Ranger's Ballpark" | 9 | 90 |
| Map Search + "Arglington" | Map Search + "Arglington Virginia" | 1 | 10 |

| Search Query Refinement Mapping for "John Doe" |||
|---|---|---|
| Search Query | Refined Result | Strength |
| Map Search + "Arglington" | Map Search + "Arglington Texas Ranger's Ballpark" | Strong |

SYSTEMS AND METHODS FOR PROVIDING PERSONALIZED SEARCH RESULTS BASED ON PRIOR USER INTERACTIONS

BACKGROUND OF THE INVENTION

1. Field of the Invention

Embodiments of this invention relate generally to search industries and, more particularly, to special purpose machines, systems, methods and computer instructions for providing personalized search results.

2. Description of the Related Art

The Internet provides access to a great number of resources, including webpages, articles, files, and the like. To locate resources of interest from the vast number of resources available on the Internet, persons typically employ an Internet search or similar service. For example, a person may visit an Internet search website and submit a search query for "Arlington Texas" in hopes of locating webpages or other resources relating to Arlington, Tex. Search services typically display search results in a ranked listing based at least in part on their relevance to a search query. For example, in response to the search for "Arlington Texas", the user may be provided with ranked listing of search results related to Arlington Tex. The displayed search result may include links to webpages, maps, etc. for businesses or other entities located in and around Arlington Tex.

Although such search techniques can provide users with a somewhat useful set of search results, the user may still have to search through the results to locate content that they are most interested in. For example, where a user is interested in the "Texas Ranger's Ballpark in Arlington", but only knows that it is a landmark in Arlington, the user may submit the search query "Arlington" and may have to search through maps, webpages or the like related to Arlington to navigate to the content that relates to the "Texas Ranger's Ballpark in Arlington. The additional searching may include search query refinements, such as modifying the query from "Arlington" to "Texas Ranger's Ballpark in Arlington", manipulating (e.g., zooming/panning)) within a displayed map to display the geographic region that includes the Texas Ranger's Ballpark, or the like. If a user repeats this process, they may have to engage the same refinements each time they conduct the search and, thus, a user may have to expend a substantial amount of time and effort to navigate from the search results to the content they are interested in.

SUMMARY OF THE INVENTION

Various embodiments of methods and apparatus for identifying and providing personalized search results are provided herein. In some embodiments, provided is a computer-implemented method that includes receiving, from a user, a plurality of search queries corresponding to a first location, providing a plurality of search results responsive to the plurality of search queries, identifying user interactions with the plurality of search results, mapping a search query corresponding to the first location to a refined result corresponding to a second location based at least in part on the user interactions with the plurality of search results, and in response to receiving, from the user, the search query relating to the first location, serving, for display to the user via a graphical user interface, refined content corresponding to the refined result corresponding to the second location.

In some embodiments, provided is a computer-implemented method that includes receiving, from a user, a plurality of search queries, receiving, from the user, a plurality of search refinements associated with the plurality of search queries (the search refinements resulting in the display of a plurality of refined results to the user) mapping one of the plurality of search queries to one of the refined results, receiving, from the user, the one of the plurality of search queries mapped to one of the refined results, and, in response to receiving the one of the plurality of search queries mapped to one of the refined results, providing, for display to the user, refined content corresponding to the one of the refined results mapped to the one of the plurality of search queries received from the user.

In some embodiments, provided is a system including one or more memories storing instructions and one or more processors coupled to the one or more memories and configured to execute the instructions stored thereon to perform the following steps: receiving, from a user, a plurality of search queries, receiving, from the user, a plurality of search refinements associated with the plurality of search queries (the search refinements resulting in the display of a plurality of refined results to the user) mapping one of the plurality of search queries to one of the refined results, receiving, from the user, the one of the plurality of search queries mapped to one of the refined results, and, in response to receiving the one of the plurality of search queries mapped to one of the refined results, providing, for display to the user, refined content corresponding to the one of the refined results mapped to the one of the plurality of search queries received from the user.

In some embodiments, provided is a non-transitory computer readable medium comprising program instructions stored thereon that are executable by a processor to cause the following steps: receiving, from a user, a plurality of search queries, receiving, from the user, a plurality of search refinements associated with the plurality of search queries (the search refinements resulting in the display of a plurality of refined results to the user) mapping one of the plurality of search queries to one of the refined results, receiving, from the user, the one of the plurality of search queries mapped to one of the refined results, and, in response to receiving the one of the plurality of search queries mapped to one of the refined results, providing, for display to the user, refined content corresponding to the one of the refined results mapped to the one of the plurality of search queries received from the user.

BRIEF DESCRIPTION OF THE DRAWINGS

FIG. 2 is an illustration of search query refinement log in accordance with one more embodiments of the present invention.

FIG. 3 is an illustration of a search query refinement mapping in accordance with one more embodiments of the present invention.

DETAILED DESCRIPTION

Figure 1:
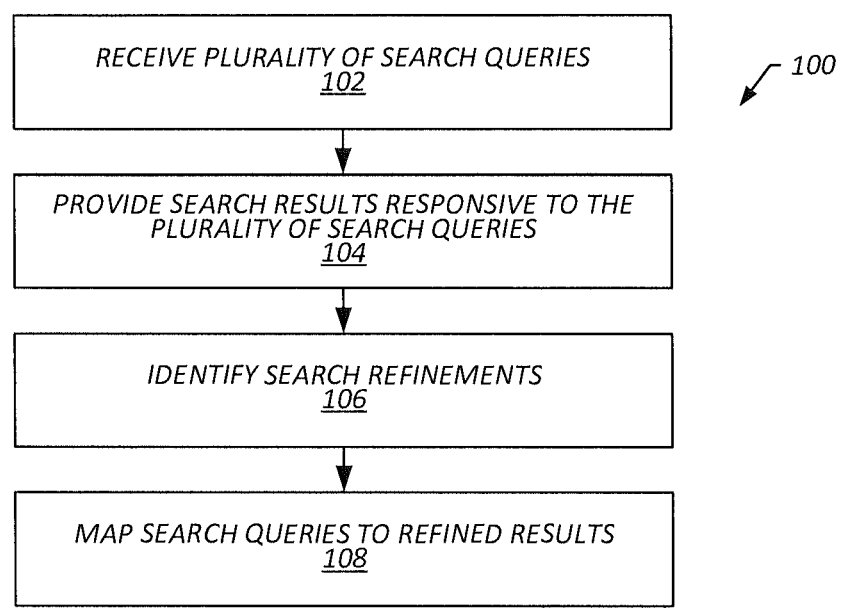
FIG. 1 is a flowchart that illustrates a method of mapping search queries to refined results in accordance with one or more embodiments of the present invention.

As discussed in more detail below, provided are systems and methods for providing personalized search results to a user based at least in part on the user's prior search interactions. An "Internet search" or "web search" may include a search that is employed by a user to locate resources on the Internet. An Internet search may include a free-text web search, a map-based web search or the like. A free-text web search may include a user submitting search criteria (e.g., a text search string or similar query input) that is used to search the Internet for resources that match or are otherwise related to the search string. A map-based web search may include a user submitting search criteria that is used to search the Internet for resources relating to places (e.g., locations, business, landmarks, points of interest, etc.) that match or are otherwise related to the search string. As a result of an Internet search, a search server may identify a set of search results that are displayed to the user. For example, in the case of a free-text search, the user may be presented with an ordered listing of a given number of the highest ranked search results of the set (e.g., including links to webpages, maps, or other resources that correspond to the highest ranked results). In the case of a map-based search, the user may be presented with a map of one or more locations and/or an ordered listing of one or more locations that correspond to the highest ranked search results of the set. Although certain embodiments are described herein with regard to map-based searches for the purpose of illustration, it will be appreciated that the same or similar techniques may be provided for any variety of search types, such as free-text searches.

As used herein, "initial set of search results" may refer to the search results that are initially returned in response to a search query. For example, where the user John Doe submits a map-based search query "Arlington", an initial set of search results may be displayed that includes maps, webpages or the like related to Arlington. In many instances, a user may make refinements to their search to navigate to or otherwise locate search results that they are interested in. If John Doe is actually interested in locating a map of the Texas Rangers Ballpark in Arlington, for example, after receiving the initial set of search results for the map-based search query "Arlington", he may make refinements to his search to locate the map. For example, he may select one of the initial search result that includes a link to the map of the Texas Rangers Ballpark in Arlington, he may edit the search query string to "Arlington Texas Ranger's Ballpark", or, where an interactive map of Arlington, Tex. is provided in the initial set of search results, he may manipulate (e.g., pan/zoom) the map such that is displays the map of the Texas Rangers Ballpark in Arlington. Such user interactions that occur shortly after the submission of a search query and/or shortly after receipt of the initial set of search results (e.g., less than about five seconds, ten seconds, twenty seconds, thirty seconds, one minute, two minutes, three minutes, five minutes, ten minutes, thirty minutes, an hour, or more after submitting the search query and/or being presented with the corresponding search query results) may be referred to herein as "search refinements". The result that the user navigates to or is otherwise directed to as a result of their search refinements of a given search query may be referred to as a "refined result" for the search query. The content of the refined result that is served to or otherwise presented to the user may be referred to herein as "refined content".

As described in more detail below, certain embodiments include identifying refined results for a search query submitted by a user, and in response to subsequently receiving the search query from the user, presenting the refined result (or at least an option to navigate directly the refined result). For example, where it has been determined that John Doe typically navigates to a map of Texas Rangers Ballpark in Arlington after he submits a map-based search query for "Arlington", upon John Doe subsequently submitting a map-based search query for "Arlington", the map of the Texas Rangers Ballpark in Arlington may be displayed.

Figure 6:
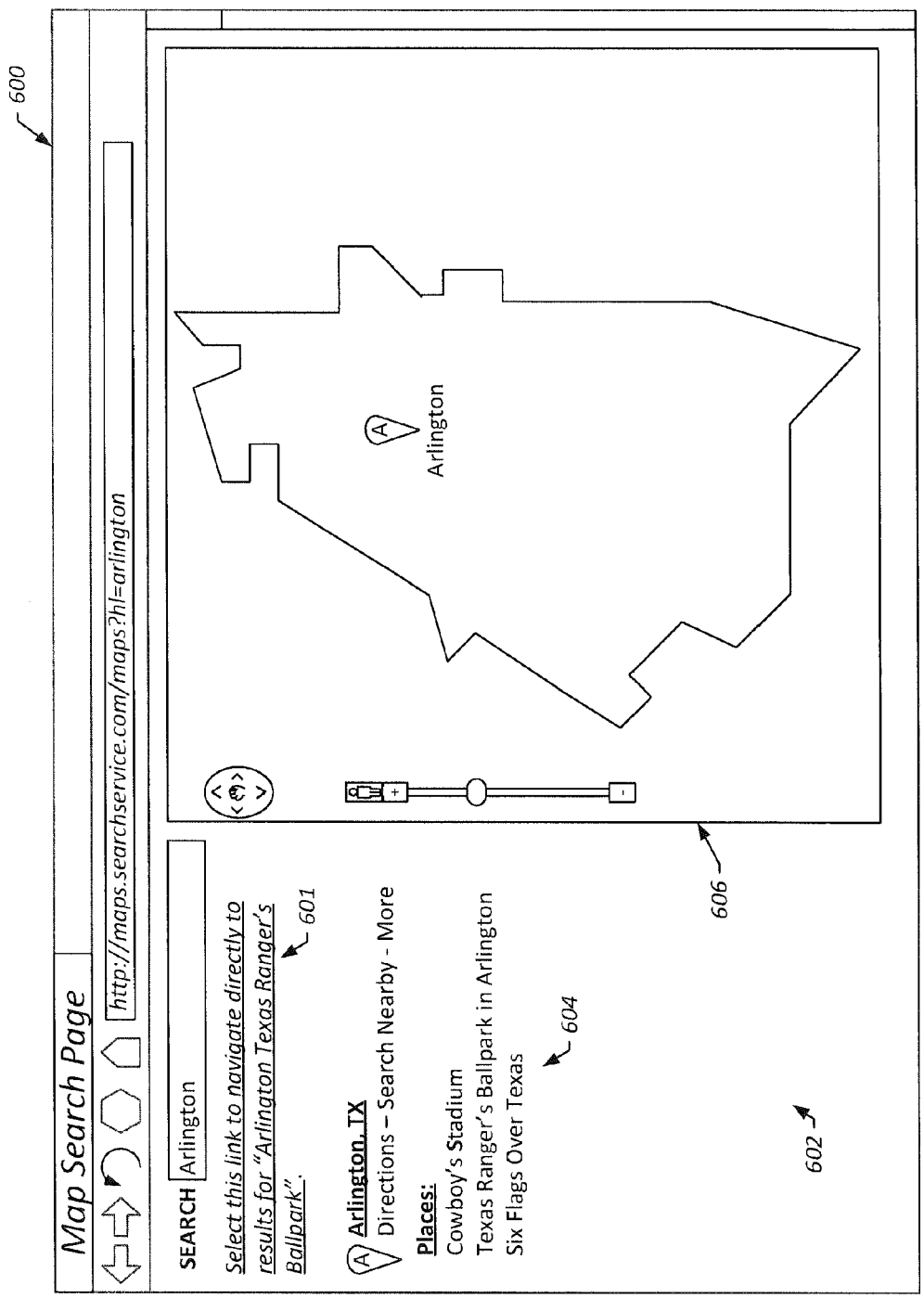
FIG. 6 is an illustration of a map-based search results webpage displaying a link to a refined result in accordance with one or more embodiments of the present invention.

In some embodiments, the refined result is displayed in place of an initial set of search results that would otherwise be displayed to the user. For example, in response to John Doe submitting the a map-based search query for "Arlington", a search results webpage including the map of the Texas Rangers Ballpark in Arlington (e.g., see FIG. 7) may be displayed in place of an initial set of search results (e.g., including a map of Arlington, Tex. as depicted in FIG. 6) that would normally be displayed in response to the map-based search query "Arlington". Thus, the user may be immediately presented with the refined result without having to navigate to the refined result or otherwise having to refine their search. For example, the map of the Texas Rangers Ballpark in Arlington may be displayed to John Doe in response to his submission of the map-based search query "Arlington" without him having to edit the search string to "Arlington Texas Ranger's Ballpark" or manipulate (e.g., pan/zoom) a displayed map of Arlington, Tex. to navigate to the map of the Texas Rangers Ballpark in Arlington.

In some embodiments, the refined result associated with a given search query submitted by a given user is identified based at least in part on historical interactions by the user following one or submissions of the search query. For example, where John Doe repeatedly submits a map-based search query for "Arlington", and typically edits the search query string to "Arlington Texas Ranger's Ballpark" the map-based search for "Arlington Texas Ranger's Ballpark" may be identified at the refined result for the search query "Arlington". As a further example, where John Doe repeatedly submits a map-based search query for "Arlington", and typically manipulates (e.g., pan/zoom) a displayed map of Arlington, Tex. to display the map of the Texas Rangers Ballpark in Arlington, a search results webpage including the map of the Texas Rangers Ballpark in Arlington may be identified as the refined result for the search query "Arlington".

Although certain embodiments are described with regard to full/complete search queries (i.e., where the user has fully entered a search query, such as "Arlington", and has submitted the search query, such as by pressing the "enter" key or via selection of a "Search" button displayed adjacent a search field), embodiments may include identifying refined results associated with a partial/incomplete search query (i.e., a search query that is only partially entered and/or has not yet been submitted by the user). For example, where the John Doe has typed in the search string "Arlington", but has not yet submitted the search query, the search system may identify the map-based search for "Arlington Texas Ranger's Ballpark" as a refined result for the partial/incomplete search query "Arlington" and display the map-based search results for "Arlington Texas Ranger's Ballpark" before John Doe even submits the search query. Such a technique may enable refined results to be dynamically identified and presented as a user enters a search query. For example, where it is determined that John Doe typically navigates to map-based search for "Arlington Texas Ranger's Ballpark" after entering the letters "Arl", when John Doe has only typed in the first three letters "Arl" the search system may identify the map-based search for "Arlington Texas Ranger's Ballpark" as a refined result for the partial/incomplete search query "Arl" and display the map-based search results for "Arlington Texas Ranger's Ballpark" before John Doe even completes or submits the search query.

In some embodiments, the refined result associated with a given search query submitted by a user is identified based at least in part on historical interactions by the user that occur at least a threshold amount (e.g., at least a threshold number and/or percentage of occurrences within a given period of time). For example, a refined result threshold may require that for a result to be identified as a refined result for a search query, within the preceding four weeks, the user must have navigated to the result on at least five occasions and at least 70% of the time shortly after submitting the search query "Arlington". Where for example, John Doe has submitted a map-based search query for "Arlington" ten times in the past four weeks, and has edited the search query string to "Arlington Texas Ranger's Ballpark" nine times after submitting the search query "Arlington", the map-based search for "Arlington Texas Ranger's Ballpark" may be identified as the refined result for the search query "Arlington". Where for example, John Doe has submitted a map-based search query for "Arlington" ten times in the past four weeks, and has edited the search query string to "Arlington Texas Ranger's Ballpark" nine times after submitting the search query "Arlington", and has manipulated a displayed map of Arlington, Tex. to display the map of the Texas Rangers Ballpark in Arlington, the search results webpage including the map of the Texas Rangers Ballpark in Arlington may be identified as the refined result for the search query "Arlington". Although exemplary threshold numbers, percentages and times have been provided for exemplary purposes, it will be appreciated that any other suitable numbers, percentages and/or times may be used. For example, a refined result threshold may require that for a result to be identified as a refined result for a search query, within the last four weeks, the user must have navigated to the result on at least three occasions and at least 40% of the time shortly after submitting the search query.

In some embodiments, a link to a refined result for a search query may be displayed in association with a set of search results for the search query. For example, where the map-based search for "Arlington Texas Ranger's Ballpark" has been identified as a refined result for the map-based search query "Arlington" submitted by John Doe, in response to John Doe submitting the search query "Arlington", an initial set of search results for "Arlington" (e.g., including any variety maps, webpages or the like related to Arlington, including those related to Arlington, Tex., Arlington, Va., or the like) may be displayed to John Doe along with a link to the results of a map-based search for "Arlington Texas Ranger's Ballpark" (e.g., see FIG. 7). Thus, the user may be able to directly navigate to the refined content via selection of the link without having to engage in a series of search refinements to indirectly navigate thereto. For example, John Doe may simply select the link to navigate to the search results for "Arlington Texas Ranger's Ballpark", as opposed to having to refine his search via editing the search query string to "Arlington Texas Ranger's Ballpark".

In some embodiments, the display of refined results and/or the display of links to refined results are based at least in part on a level of historical interactions by the user. For example, the initial set of search results for a given search query may be displayed where no refined result is identified for the search query, the initial set of search results for a search query and a link to a refined result may be displayed where the refined result is identified as being navigated to after the search query at least a relatively low number/percentage of times, and the refined result may be displayed where the refined result is identified as being navigated to after the search query at least a relatively high number/percentage of times. For example, where John Doe does not consistently navigate to a particular refined result after submitting the map-based search query "Arlington" (e.g., within the last four weeks John Doe has not navigated to any particular content on least three occasions and at least 40% of the time shortly after submitting the map-based search query "Arlington"), no refined content may be identified for the map-based search query "Arlington" by John Doe and, John Doe may simply be presented with the initial set of search results for the map-based search query "Arlington" upon his submission of the map-based search query "Arlington". Where John Doe somewhat consistently edits the search query string to "Arlington Texas Ranger's Ballpark" (e.g., within the last four weeks has edited the search query string to "Arlington Texas Ranger's Ballpark" on least three occasions and at least 40% of the time shortly after submitting the map-based search query "Arlington"), the map-based search for "Arlington Texas Ranger's Ballpark" may be identified as a second-level refined result for the search query "Arlington", and John Doe may be presented with the initial set of search results for the map-based search query "Arlington", along with a link to the results of the map-based search for "Arlington Texas Ranger's Ballpark" upon his submission of the map-based search query "Arlington". Where John Doe consistently edits the search query string to "Arlington Texas Ranger's Ballpark" (e.g., within the last four weeks has edited the search query string to "Arlington Texas Ranger's Ballpark" on least five occasions and at least 70% of the time shortly after submitting the map-based search query "Arlington"), the map-based search for "Arlington Texas Ranger's Ballpark" may be identified as a first-level refined result for the search query "Arlington", and John Doe may be presented with the results of the map-based search for "Arlington Texas Ranger's Ballpark" upon his submission of the map-based search query "Arlington". Thus, where a user's historical interactions with results of a search query fall within a first range of activity, a traditional set of search results for a search query may be displayed in response to the user submitting the search query, where a user's historical interactions with results of a search query fall within a second range of activity that is associated with a refined result, a traditional set of search results along with an option to directly navigate to the refined result may be displayed in response to the user submitting the search query, and where a user's historical interactions with results of a search query fall within a third range of activity that is associated with a refined result, the refined results may be displayed in response to the user submitting the search query.

In some embodiments, a log of historical user search queries and associated user interactions (e.g., refinements) is stored in a database (e.g., datastore 810) or similar data repository. For example, for the user John Doe, a refinement log may be generated that includes an index of search queries and corresponding refined results submitted by John Doe over a given period (e.g., four weeks) (e.g., see FIG. 2). In some embodiments, the log includes one or more search-query/result pairs. A search-query may include a search query profile that defines characteristics of the corresponding search query, such as a search query context (e.g., free-text search, map-based search, etc.) and search query criteria (e.g., a search string). For example, where John Doe submits a map-based search query "Arlington", the search-query-profile for a corresponding entry of the log may include a search context of "Map Search" and a search query criteria of "Arlington". The result may identify a result navigated to by the user after the search query. For example, the result may identify the map-based search for "Arlington Texas Ranger's Ballpark" that is navigated to by John Doe after submitting the map-based search for "Arlington". In some embodiments, the log includes a record of the number and/or percentages of times the user has engaged in the search and subsequently refined the search to arrive at the corresponding result. Where for example, the log tracks interaction for the past four weeks and John Doe has submitted a map-based search query for "Arlington" ten times in the last four weeks, and has edited the search query string to "Arlington Texas Ranger's Ballpark" nine times shortly after submitting the search query, the log may include a count of nine and a percentage of 90% for the corresponding search-query/result pair relating to John Doe's map-based search "Arlington". Although the illustrated log includes a log of activities for a single user (John Doe) for illustrative purposes, other embodiments may include a similar log for any number of users or a single log that includes search-query/results pairs for any number of users.

In some embodiments, a mapping of search-queries to refined-results is generated based at least in part on the historical user search queries and associated user interactions (e.g., see FIG. 3). For example, the refinement log may be assessed to identify refined results that include search-query/results pairs that meet at least minimum threshold criteria (e.g., a minimum number and/or percentages of occurrences within a given time frame). In some embodiments, the mapping includes a strength that is associated with the level of historical interactions associated with the refined result. For example, a first level (e.g., corresponding to a strength of "weak") may be associated with those search-query/result pairs that occur somewhat consistently, and a second level (e.g., corresponding to a strength of "strong") may be associated with those query-profile/refined-query-result pairs that occur consistently. In some embodiments, the search results displayed to the user in response to a given search query may be based at least in part on the mapping. For example, in response to receiving a map-based search for "Arlington" from John Doe, a search server may access the mapping, determine that the map-based search for "Arlington" submitted by John Doe is strongly mapped to a refined result that corresponds to, the map-based search for "Arlington Texas Ranger's Ballpark", and in response to the determination, may identify and serve, for display to John Doe, a search result web-page that includes the results of the map-based search for "Arlington Texas Ranger's Ballpark" (e.g., see FIG. 7). If the map-based search for "Arlington" submitted by John Doe were to be weakly mapped to the refined result that corresponds to the map-based search for "Arlington Texas Ranger's Ballpark", the search server may serve, for display to John Doe, a search result web-page that includes a set of search results for the map-based search query "Arlington" along with a link to the results of the map-based search for "Arlington Texas Ranger's Ballpark" (e.g., see FIG. 6). In some embodiments, the mapping is stored in a database (e.g., datastore 810) or similar data repository.

It will be appreciated that such logs and mappings may be anonymized to protect the identity of the user. For example, the log may be associated with a user ID (e.g., 1234), as opposed to actual name of the user. Moreover, the user may be provided an option enable such records to be maintained. For example, prior to allowing a search service to engage in provided personalized search results as described herein, the user may be provided with a description of the data that is to be collected and its use, as well as an option to enable collection and use of the data. Further, it will be appreciated that such logs and mapping may only be maintained during a period for which they are relevant. For example, the logs/mapping may only reflect data that has been collected within the last four weeks, with the older data being purged from the log/mapping.

FIG. 1 is a flowchart that illustrates a method 100 of mapping search queries to refined results in accordance with one or more embodiments of the present invention. Method 100 may include receiving a plurality of search queries from one or more users (block 102). In some embodiments, the search queries may include any variety of search queries received from one or more users. For example, receiving a plurality of search queries from a user may include a search server receiving, from a user device, one or more free-text searches, map-based searches or the like submitted by John Doe. In some embodiments, the search queries may be associated with one or more locations. For example, the one or more free-text searches, map-based searches or the like submitted by John Doe may include one or more free-text searches or map-based searches for the query string "Arlington". In some embodiments, an identity of a user submitting the search queries may be identified by the search server based at least in part on credential information provided by the users (e.g., user log-in information such as name and password), cookie information stored in the user's browser and transmitted to the search server, or the like. Such identity data may be used to associate logged searches and/or refinements to the user.

Method 100 may include providing search results responsive to the plurality of search queries (block 104). In some embodiments, providing search results responsive to the plurality of search queries may include, for each of the search queries, providing for the display of the corresponding search result content. For example, with regard to the search query for "Arlington", the search server may process the search query to identify an initial set of search results responsive to the search query (e.g., including any variety maps, webpages or the like related to Arlington, including those related to Arlington, Tex., Arlington, Va., or the like), and serve, to the user device for display to John Doe, a webpage that includes content (e.g., webpage links, maps, etc.) that corresponds to the initial set of search results identified as being responsive to the search query (e.g., see FIG. 5). In some embodiments, the set of initial search results is identified and ranked using various search techniques, such as identifying search results including content that matches or is at least similar to the search criteria, and ranking the results based on their global prominence (e.g., popularity globally), their local prominence (e.g., their popularity in the location where the user identified as being is located), etc.

Method 100 may include identifying search refinements (block 106). In some embodiments, identifying search refinements includes identifying search refinements by the user shortly after submission of the search query and/or presentation of the search query results. For example, with regard to the map-based search query for "Arlington" submitted by John Doe, identifying search refinements may include identify subsequent actions by John Doe, such as editing the search string "Arlington" to "Arlington Texas Ranger's Ballpark", panning/zooming a displayed interactive map of Arlington, Tex. to the geographic region including the Texas Rangers Ballpark in Arlington, and so forth shortly after he submitted the search query and/or was presented with the search query results. In some embodiments, identifying search refinements includes generating a refinement log. For example, where John Doe refines the search string from "Arlington" to "Arlington Texas Ranger's Ballpark" after being presented with a traditional set of search results for the map-based search query of "Arlington", a refinement log may be generated/updated to reflect the refinement by John Doe.

FIG. 2 is an illustration of refinement log 200 in accordance with one more embodiments of the present invention. Refinement log 200 may include a record of refinements made by one or more users subsequent to submitting search queries. For example, refinement log 200 may include a record of search queries and search query refinements submitted by John Doe. In the illustrated embodiment, refinement log 200 includes search-query/result pairs 202, including a query-profile 204 and a result 206, as well as corresponding number 208 and/or percentages of times the search queries and refinement by the user have occurred 210 within the last four weeks. For example, in the illustrated embodiment, refinement log 200 indicates that, shortly after submitting the a map-based search query for "Arlington" ten times within the last four weeks, John Doe has refined the search string from "Arlington" to "Arlington Texas Ranger's Ballpark" nine times (i.e., 90% of the time), and refined the search string from "Arlington" to "Arlington Va." one time (i.e., 10% of the time). In some embodiments, refinement log 200 may be stored in a memory, such as a database (e.g., database 810) or a similar memory location accessible by the search server. Although the illustrated log includes a log of full/complete search queries for illustrative purposes, embodiments may include a log of partial/incomplete search queries. For example, where John Doe has entered a partial map-based search query for "Arl" ten times in the last four weeks (e.g., when entering the search string "Arlington") and has ultimately searched for "Arlington Texas Ranger's Ballpark" nine times shortly after completing and submitting the search query, the log may include a count of nine and a percentage of 90% for a corresponding search-query/result pair relating to John Doe's partial map-based search for "Arl" and the refined result including a map-based search for "Arlington Texas Ranger's Ballpark".

Method 100 may include mapping of search queries to refined results (block 108). In some embodiments, mapping of search queries to refined results is based at least in part on the identified search refinements. For example, mapping of search queries to refined results may include assessing refinement log 200 to identify search-query/result pairs that satisfy at least a minimum threshold criteria (e.g., occur at least a minimum threshold number/percentage of times within a given time frame).

In some embodiments, the thresholds number/percentages used to identify mappings may include ranges that are associated with various levels of interaction that can be used to identify strengths of the mappings. For example, a first level (e.g., corresponding to a strength of "weak") may be associated with those search-query/result pairs that occur somewhat consistently (e.g., within the last four weeks the user has navigated to the refined result shortly after submitting the search query on least three occasions and at least 40% of the time). A second level (e.g., corresponding to a strength of "strong") may be associated with those search-query/result pairs that occur consistently (e.g., within the last four weeks the user has navigated to the refined result shortly after submitting the search query on least five occasions and at least 70% of the time).

FIG. 3 is an illustration of a refinement mapping 300 in accordance with one more embodiments of the present invention. In the illustrated embodiments, mapping 300 includes a listing of search-query/result pairs 202 that have been identified as meeting the criteria for a refined result based at least in part on the information provided in refinement log 200. Although the illustrated mapping includes a mapping of the full/complete search queries for illustrative purposes, embodiments may include mappings of partial/incomplete search queries. For example, a partial map-based search query for "Arl" may be mapped to a refined result that includes the map-based search for "Arlington Texas Ranger's Ballpark". Refinement mapping 300 also includes an indication of the strength of the particular mappings. Although certain embodiments refer to accessing a refinement mapping 300 to identify mappings between query profiles and refined query results, it will be appreciated that other embodiments may include identifying mappings via direct assessment of the information contained in refinement log 200 or similar information resource.

In some embodiments, the search results displayed to the user in response to a given search query may be based at least in part on a refinement mapping. For example, in response to receiving a map-based search for "Arlington" from John Doe, a search server may access the refinement mapping 300, determine that the map-based search "Arlington" submitted by John Doe is strongly mapped to a refined result that corresponds to the map-based search "Arlington Texas Ranger's Ballpark", and, in response to the determination, may identify search results for the map-based search "Arlington Texas Ranger's Ballpark" and serve, for display to John Doe, a search result web-page that includes search results for the map-based search "Arlington Texas Ranger's Ballpark" (e.g., see FIG. 7). Were, for example, the mapping to identify a weak mapping to the refined result that corresponds to the map-based search "Arlington Texas Ranger's Ballpark", the search server may identify the search results for the map-based search query "Arlington" and serve, for display to John Doe, a search results web-page that includes a set of search results for the map-based search query "Arlington" along with a link to search results for the map-based search "Arlington Texas Ranger's Ballpark" (e.g., see FIG. 6).

Figure 4:
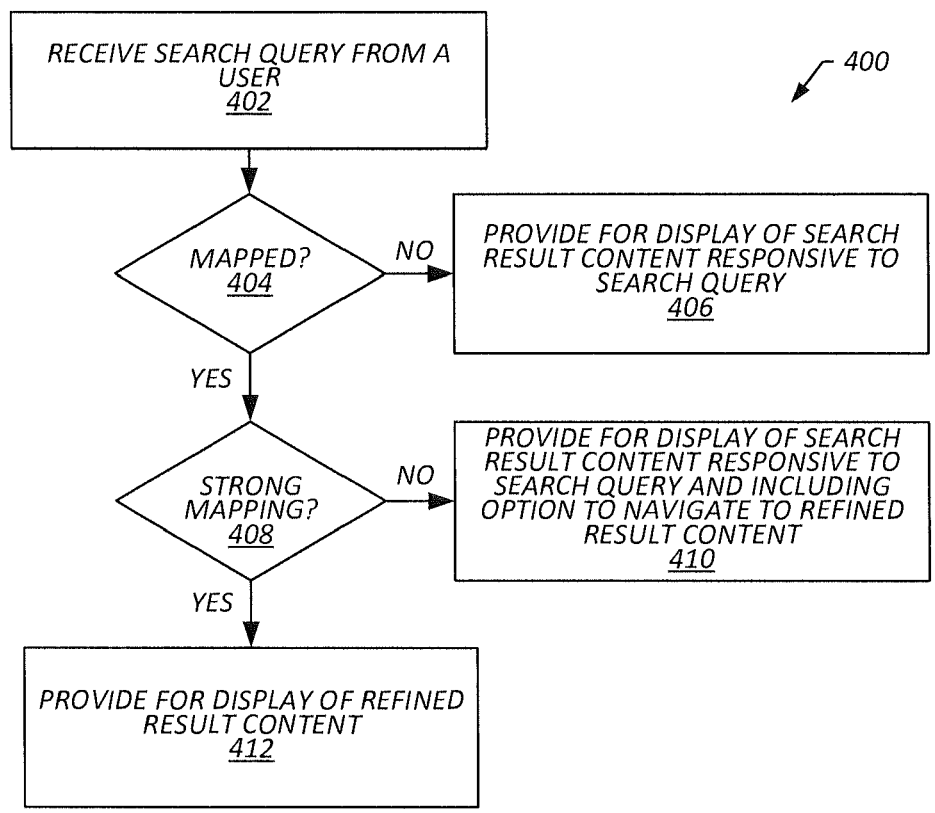
FIG. 4 is a flowchart that illustrates a method of providing personalized search results in accordance with one or more embodiments of the present invention.

FIG. 4 is a flowchart that illustrates a method 400 of providing personalized search results in accordance with one or more embodiments of the present invention. Method 400 may include receiving a search query from a user (block 402). Receiving a search query from a user may include, for example, a search server receiving, from a user device, a partial or full search query provided by John Doe. In some embodiments, the search query may be associated with one more locations. For example, the search query submitted by John Doe may include map-based search for "Arlington". In some embodiments, an identity of the user may be identified by the search server based at least in part on credential information provided by the user (e.g., user log-in information such as name and password), cookie information stored in the user's browser and transmitted to the search server, or the like. Such identity information may be used to associate the user to a particular refinement long and/or mapping. For example, upon logging in, a session for John Doe may be opened that logs searches and refinements by John Doe to refinement log 200, and/or relies on refinement log 200 and/or mapping 300 for identifying search results and/or refined results.

Method 400 may include determining whether the search query is mapped to a refined result (block 404). In some embodiments, determining whether the search query is mapped to a refined result may include assessing a refinement mapping for the user. For example, in response to receiving the map-based search "Arlington" from John Doe, the search server may access refinement mapping 300 for John Doe to determine whether refinement mapping 300 includes a query profile 204 that corresponds to (e.g., matches or is otherwise related to) the map-based search "Arlington". In the illustrated embodiment, it may be determined that refinement mapping 300 does include a query profile 204 (e.g., "Map Search+'Arlington'") that does correspond to the map-based search "Arlington" submitted by John Doe and, thus, it may be determined that the search query is mapped to a refined result. If, for example, the refinement mapping 300 did not include a mapping of the map-based search query "Arlington" to a refined result, it may be determined that the search query is not mapped to a refined result. In some embodiments, determining whether the search query is mapped to a refined result may include assessing a refinement mapping for the user to determine whether or not a partial search query is mapped to a refined result. For example, where the partial map-based search for "Arl" is mapped to the map-based search for "Arlington Texas Ranger's Ballpark", upon John Doe has typing in the letters "Arl" in a map-based search field, the search server may identify the map-based search for "Arlington Texas Ranger's Ballpark" as a refined result for the partial/incomplete search query "Arl" and display the map-based search results for "Arlington Texas Ranger's Ballpark" before John Doe even completes or submits the search query.

Although certain embodiments refer to accessing refinement mapping 300 to identify mappings between query profiles and refined results, it will be appreciated that other embodiments may include identifying mappings via direct assessment of refinement log 200 (or similar information resource) in a manner similar to that described with regard to generating refinement mapping 300 (e.g., at block 108). For example, it may be determined that a query profile 204 is mapped to a refined result 206, and/or a corresponding strength of the mapping may be determined, based at least in part on a comparison of corresponding number 208 and/or percentages 210 of occurrences to relevant thresholds.

Figure 5:
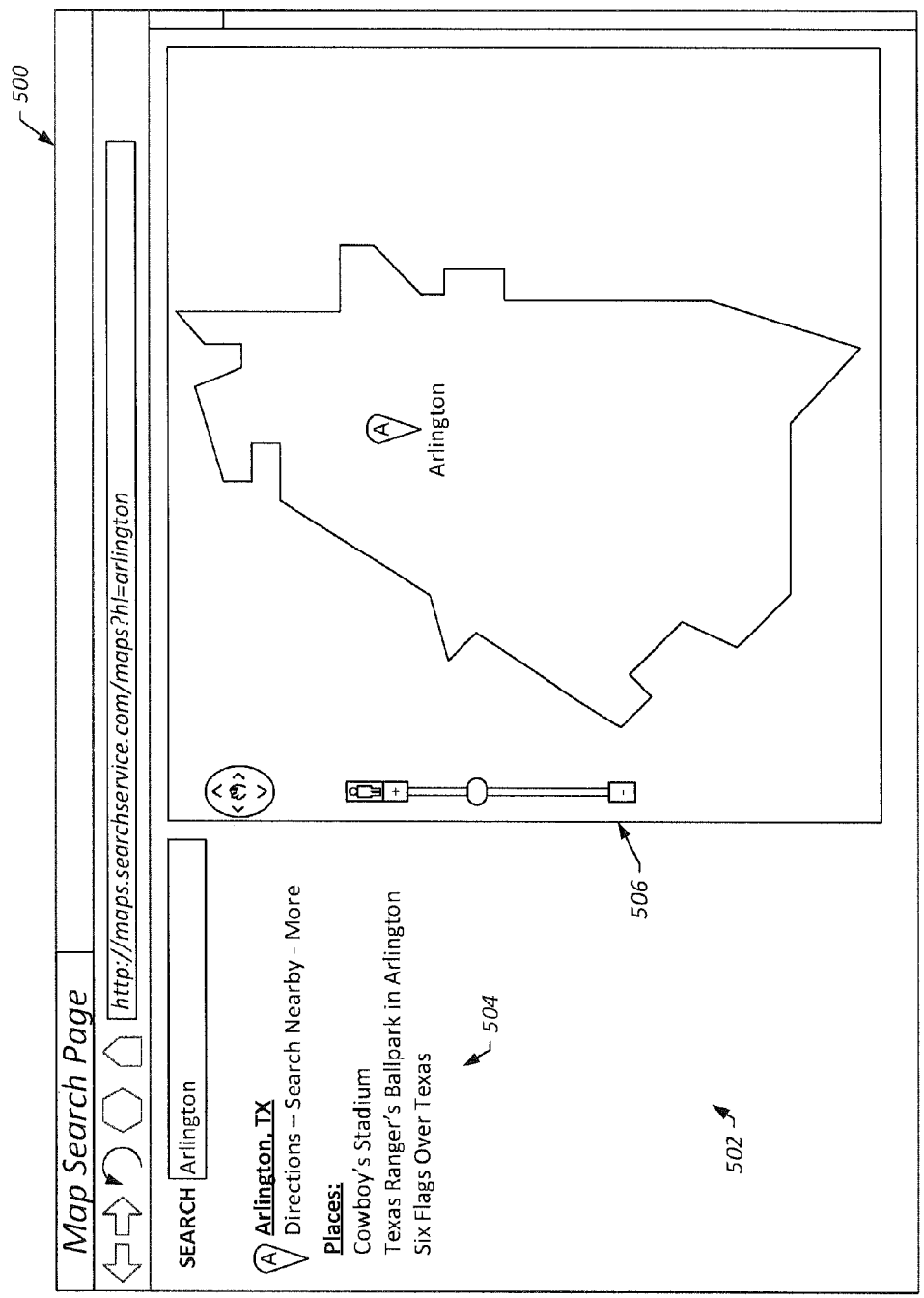
FIG. 5 is an illustration of a map-based search results webpage displaying search results in accordance with one or more embodiments of the present invention.

Method 400 may include, in response to determining that that the search query is not mapped to a refined result, providing for the display of search results content corresponding to the search query (block 406). For example, in response to determining the map-based search query for "Arlington" is not mapped to a refined result, the search server may identify a set of search results that are responsive to the map-based search "Arlington" and serve, to the user device for display to John Doe, a search results web-page similar including the set of search results that are responsive to the map-based search "Arlington" in a manner similar to that of FIG. 5. FIG. 5 is an illustration of a map-based search results webpage 500 displaying search results 502 in accordance with one or more embodiments of the present invention. As depicted, search results 502 include an exemplary listing of search results 504 (including a link to a place page for Arlington, Tex.) and an interactive geographic map 506 (of Arlington, Tex.) that are responsive to the map-based search query "Arlington".

Method 400 may include, in response to determining that the search query is mapped to a refined result, determining whether the mapping is strong or weak (block 408). In some embodiments, determining whether the search query is strongly mapped to the refined result may include further assessing the refinement mapping for the user. For example, in response to determining that refinement mapping 300 includes a query profile 204 that corresponds to the map-based search "Arlington" by John Doe, it may be determined that the mapping is "strong" based at least in part on the corresponding strength 302 provided in refinement mapping 300. The mapping may be determined to be "weak" if strength 302 were to include a listing of weak as opposed to strong.

Method 400 may include, in response to determining that that mapping is weak, providing for the display of search result content responsive to the search query and including an option to navigate to refined result content (block 410). For example, in response to determining that the mapping of the map-based search for "Arlington" to the map-based search query "Arlington Texas Ranger's Ballpark" is weak, the search server may identify a set of search results that are responsive to the map-based search "Arlington" and serve, to the user device for display to John Doe, a search results web-page including the set of search results that are responsive to the map-based search "Arlington", along with a link to results of map-based search query "Arlington Texas Ranger's Ballpark", in a manner similar to that of FIG. 6.

FIG. 6 is an illustration of a map-based search results webpage 600 including a link 601 to a refined result in accordance with one or more embodiments of the present invention. As depicted, search results 602 include a listing of search results 604 (including a link to a place page for Arlington, Tex.) and an interactive geographic map 606 (of Arlington, Tex.) that are responsive to the map-based search query "Arlington". Upon selection of link 601, the user may be redirected to a set of refined search results that are responsive to the map-based search query "Arlington Texas Ranger's Ballpark" (e.g., see FIG. 7). That is, the user can select link 601 to navigate directly to the refined search result.

Method 400 may include, in response to determining that that mapping is strong, providing for the display of refined result content (block 412). For example, in response to determining that the mapping of the map-based search for "Arlington" to the map-based search query "Arlington Texas Ranger's Ballpark" is strong, the search server may identify a set of search results that are responsive to the map-based search "Arlington Texas Ranger's Ballpark" and may serve, to the user device for display to John Doe, a search results web-page including a set of search results that are responsive to the map-based search "Arlington Texas Ranger's Ballpark" in a manner similar to that of FIG. 7.

Figure 7:
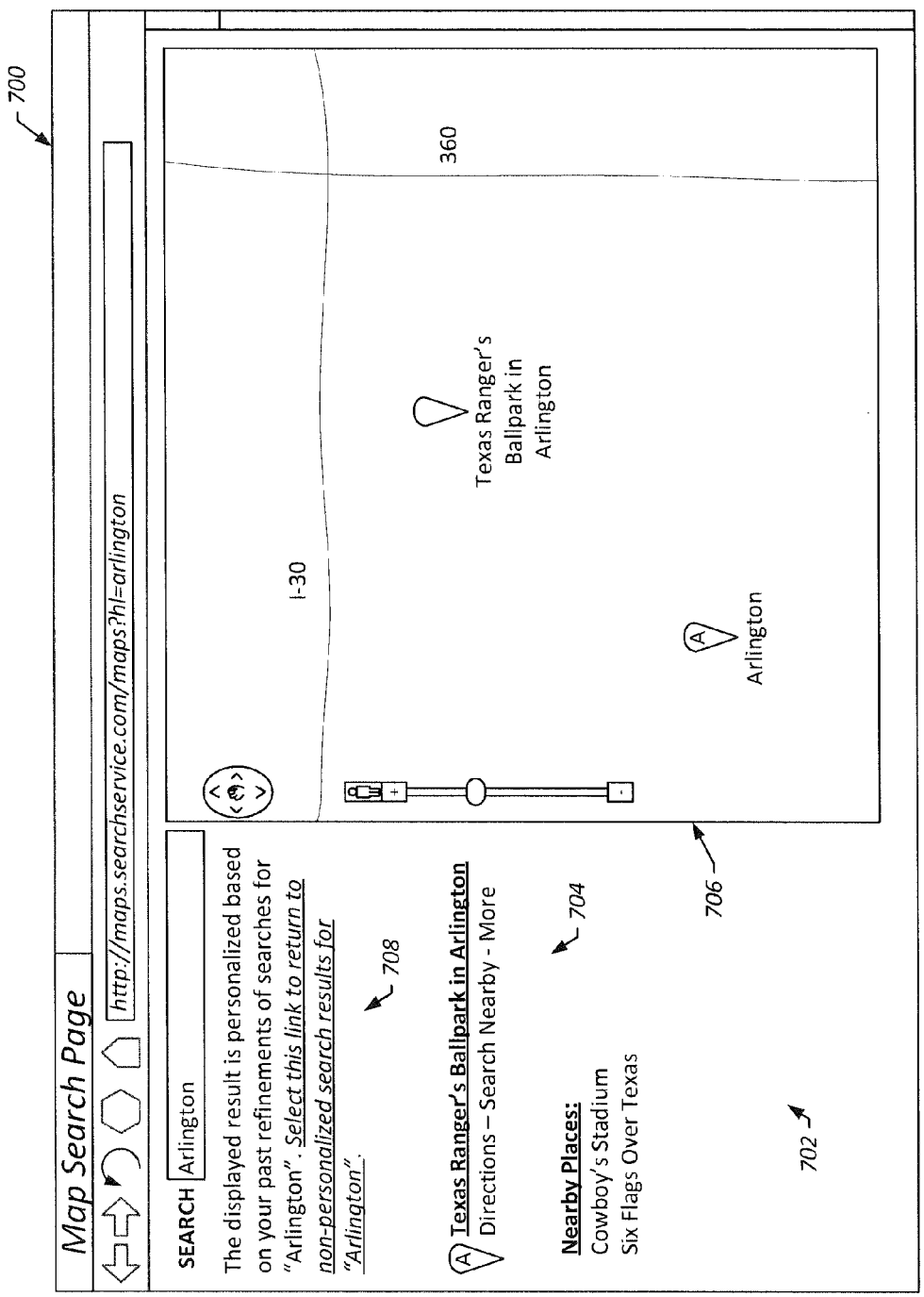
FIG. 7 is an illustration of a map-based search results webpage displaying a refined result in accordance with one or more embodiments of the present invention.

FIG. 7 is an illustration of a map-based search results webpage 700 displaying a refined result 702 in accordance with one or more embodiments of the present invention. As depicted, refined result 702 includes a listing of search results 704 (including a link to a place page for Texas Ranger's Ballpark in Arlington) and an interactive geographic map 706 (of the region including the Texas Ranger's Ballpark in Arlington) that are responsive to the map-based search query "Arlington Texas Ranger's Ballpark". In the illustrated embodiment, webpage 700 also includes a user selectable link 708 for returning to non-personalized search results (e.g., the initial, unrefined set of search results). Upon selection of link 708, the user may be redirected to a search results webpage similar to that of FIG. 5 or FIG. 6. That is, the user can select link 708 to navigate to unrefined search results that are at least partially responsive to the initial map-based search query "Arlington".

Method 100 and 400 are exemplary embodiments of methods that may be employed in accordance with techniques described herein. Methods 100 and 400 may be may be modified to facilitate variations of its implementations and uses. Methods 100 and 400 may be implemented in software, hardware, or a combination thereof. Some or all of methods 100 and 400 may be implemented by one or more of the modules/ applications described herein, such as query processing module 812 or application 808 depicted and described in more detail below with regard to FIG. 8. The order of the steps of methods 100 and 400 may be changed, and various elements may be added, reordered, combined, omitted, modified, etc.

Figure 8:
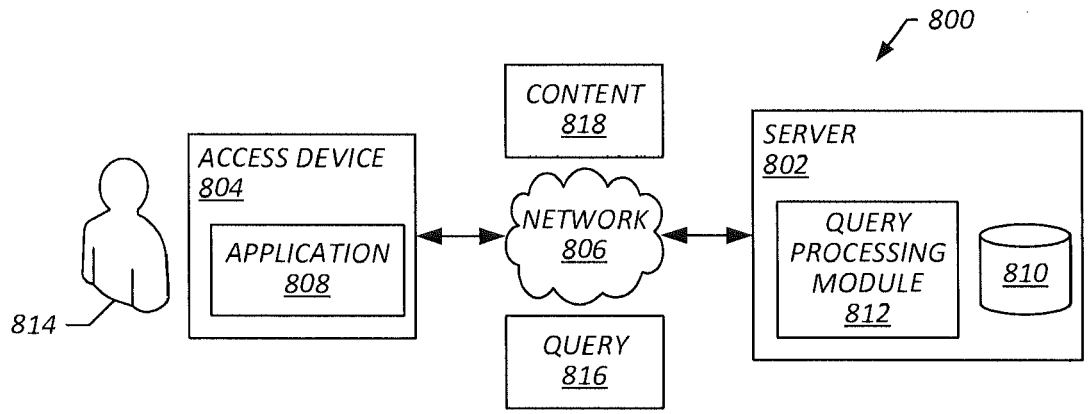
FIG. 8 is a block diagram that illustrates a search query environment in accordance with one or more embodiments of the present invention.

FIG. 8 is a block diagram that illustrates an exemplary search query environment 800. Environment 800 includes a server 802 and an access device 804 communicatively coupled via a network 806.

Network 806 may include an electronic communications network, such as the Internet, a local area network (LAN), a wide area (WAN), a cellular communications network or the like. Network 806 may include a single network or combination of networks.

Access device 804 may include a device capable of communicating information via network 806. For example, access device 804 may include a personal computer (e.g., a desktop computer), a mobile computing device (e.g., a laptop or tablet computer), a cellular communication device (e.g., a cellular phone), a personal digital assistant (PDA), or the like. In some embodiments, access device 804 is a client device of server 802. In some embodiments, access device 804 includes various input/output (I/O) interfaces, such as a graphical user interface (e.g., display screen), an audible output user interface (e.g., speaker), an audible input user interface (e.g., microphone), a keyboard, a pointer/selection device (e.g., mouse, trackball, touchpad, touchscreen, stylus or the like), a printer, or the like. In some embodiments, access device 804 includes general computing components and/or embedded systems optimized with specific components for performing specific tasks. In some embodiments, access device 804 includes a computer system similar to that of computer system 1000 described below with regard to at least FIG. 9.

In some embodiments, access device 804 includes programs/applications 808 that can be used to generate a request for content (e.g., a search query), to provide content, to render content, and/or client application used to send request to and receive request from other devices (e.g., server 802) via network 806. For example, access device 804 may include Internet browser application that facilitates communication with server 802 and/or other entities of environment 800. In some embodiments, application 808 includes modules having program instructions that are executable by a computer system to perform some or all of the functionality described herein with regard to access device 804.

Server 802 may include a network entity that serves requests by client entities, such as requests by access device 804. Server 802 may host a content site, such as a website, a file transfer protocol (FTP) site, an Internet search website or other source of network content. In some embodiments, server 802 includes a search server (e.g., a search engine). In some embodiments, server 802 includes or otherwise has access to a datastore 810, such as a database or similar data repository. In some embodiments, server 802 includes a query processing module 812. Query processing module 812 may include program instructions that are executable by a computer system to perform some or all of the functionality described herein with regard to server 802. In some embodiments, server 802 includes a computer system similar to that of computer system 1000 described below with regard to at least FIG. 9. Although server 802 is represented by a single box in FIG. 8, server 802 may include a single server (or similar system), or a plurality of servers (and/or similar systems). For example, server 802 may include a plurality of different servers (and/or similar systems) that may be employed individually or in combination to perform some or all of the functionality described herein with regard to server 802.

In some embodiments environment 800 is used to employ techniques described herein. For example, a user 814 (e.g. John Doe) may submit a search query 816 (e.g., map-based search for "Arlington") via access device 804, server 802 (e.g., a search server) may process the query and serve content 818 (e.g., search results webpages 500, 600 and/or 700) to access device 804, and application 808 may render content 818 for display to user 814. In some embodiments, some or all of the processing of search query 816 is provided by access device 804 and/or query processing module 812. For example, application 808 may be used to receive a search query from a user, log search query refinements, map search queries to search query refinements, receive a search query from a user, identify whether a search query is mapped to a refined search query (and a strength of the mapping), submit the search query (or the refined search query if the search query is mapped to a refined search query) to query processing module 812, query processing module 812 may process the search query (or refined search query) to identify corresponding search results and/or refined results, and query processing module 812 may generate and serve search webpages including the search results, the refined results and/or links to the search results and the refined search results to application 808, and application 808 may render the webpages for display via a graphical user interface of access device 804.

Exemplary Computer System

Figure 9:
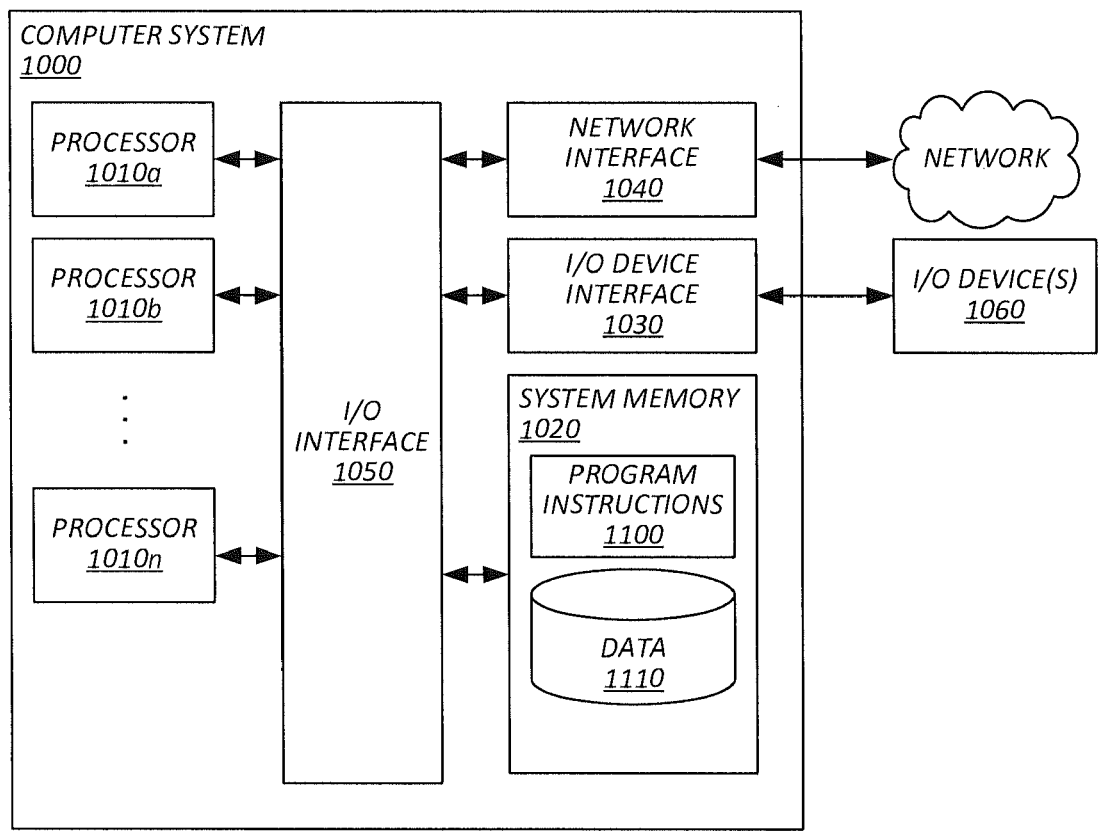
FIG. 9 is a block diagram that illustrates an exemplary computer system in accordance with one or more embodiments of the present invention.

FIG. 9 is a block diagram that illustrates an exemplary computer system 1000. Various portions of systems and methods described herein, may include or be executed on one or more computer systems similar to system 1. For example, server 802 and/or access device 804 may include a configuration similar to at least a portion of computer system 1000. Further, methods/processes/modules described herein (e.g., query processing module 812 and/or application 808) may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof, or the like. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium having program instructions stored thereon that are executable by a computer processor (e.g., one or more of processors 1010a-1010n) to cause some or all of the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 3020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
    receiving, from a user, a plurality of search queries corresponding to a geographic area;
    providing a plurality of search results responsive to the plurality of search queries;
    identifying user interactions with the plurality of search results, including identifying a plurality of refinements to the plurality of search results made by the user, each refinement including an indication of a location within the geographic area;
    when the user refines the plurality of search results by selecting a same location in response to the plurality of search queries corresponding to the geographic area at least a predetermined amount which is more than once:
        mapping a search query corresponding to the geographic area to a search query corresponding to the same location based on the plurality of refinements to the plurality of search results; and
        subsequent to mapping the search query corresponding to the geographic area to the search query corresponding to the same location and in response to receiving, from the user, a new search query relating to the geographic area, serving, for display to the user via a graphical user interface, refined content including an indication of the same location responsive to the search query corresponding to the same location.

2. The method of claim 1, wherein the refined content is configured to be displayed to the user prior to subsequent refinement of the search query by the user such that the user is presented with the refined content without having to refine the search query.

3. The method of claim 1, wherein a refinement comprises content that the user navigates to in response to being provided with the plurality of search results.

4. The method of claim 1, wherein the refined content comprises a network content page corresponding to the same location.

5. The method of claim 1, wherein the refined content comprises a network content page comprising a user selectable link to navigate directly to a network content page corresponding to the same location.

6. The method of claim 1, wherein the refined content displayed is based at least in part on a strength of a mapping between the search query corresponding to the geographic area and the search query corresponding to the same location.

7. The method of claim 1, wherein the plurality of search queries comprise map-based search queries.

8. A computer-implemented method comprising:
    receiving, from a user, a plurality of search queries corresponding to a geographic area;
    receiving, from the user, a plurality of search refinements associated with the plurality of search queries, the search refinements resulting in the display of a plurality of refined results to the user and including an indication of a location within the geographic area;
    when the user refines the plurality of search results by selecting a same location in response to the plurality of search queries corresponding to the geographic area at least a predetermined amount which is more than once:
        mapping one of the plurality of search queries corresponding to the geographic area to a search query corresponding to the same location in the refined results;
        subsequent to mapping the search query corresponding to the geographic area to the search query corresponding to the same location, receiving, from the user, the one of the plurality of search queries mapped to the search query corresponding to the same location included in one of the refined results; and
        in response to receiving the one of the plurality of search queries mapped to the search query corresponding to the same location, providing, for display to the user, refined content including an indication of the same location responsive to the search query corresponding to the same location.

9. The method of claim 8, wherein the refined content is configured to be displayed to the user prior to subsequent user refinement of the one of the plurality of search queries such that the user is presented with the refined content without having to refine the one of the plurality of search queries.

10. The method of claim 8, wherein a refinement comprises content that the user navigates to in response to being provided with the plurality of search results.

11. The method of claim 8, wherein mapping one of the plurality of search queries corresponding to the geographic area to a search query corresponding to the same location comprises:
   identifying a refined result that comprises content including a same location that the user navigates to at least a threshold number and percentage of times in response to being provided with one of the plurality of search queries; and
   mapping the one of the plurality of search queries to a search query corresponding to the same location included in the one of the refined results identified.

12. The method of claim 8, wherein providing, for display to the user, refined content including an indication of the same location responsive to the search query corresponding to the same location comprises providing for display a user selectable link to navigate directly to the one of the refined results.

13. The method of claim 8, wherein providing, for display to the user, refined content including an indication of the same location responsive to the search query corresponding to the same location comprises providing for display the one of the refined results.

14. The method of claim 8, further comprising:
   receiving, from the user, a search query that is not mapped to a refined result; and
   providing, for display to the user, content corresponding to an initial set of search results responsive to the search query.

15. The method of claim 8, wherein the plurality of search queries comprises a plurality of map-based search queries.

16. The method of claim 15, wherein the plurality of search refinements associated with the plurality of search queries comprises edits to a map-based search string by the user.

17. The method of claim 15, wherein the plurality of search refinements associated with the plurality of search queries comprises manipulation of an interactive map presented to the user.

18. A system comprising:
   one or more memories storing instructions; and
   one or more processors coupled to the one or more memories and configured to execute the instructions stored thereon to perform the following steps:
      receiving, from a user, a plurality of search queries corresponding to a geographic area;
      receiving, from the user, a plurality of search refinements associated with the plurality of search queries, the search refinements resulting in the display of a plurality of refined results to the user and including an indication of a location within the geographic area;
      when the user refines the plurality of search results by selecting a same location in response to the plurality of search queries corresponding to the geographic area at least a predetermined amount which is more than once:
         mapping one of the plurality of search queries corresponding to the geographic area to a search query corresponding to the same location in the refined results;
         subsequent to mapping the search query corresponding to the geographic area to the search query corresponding to the same location, receiving, from the user, the one of the plurality of search queries mapped to one of the refined results; and
         in response to receiving the one of the plurality of search queries mapped to the search query corresponding to the same location, providing, for display to the user, refined content including an indication of the same location responsive to the search query corresponding to the same location.

19. A non-transitory computer readable medium comprising program instructions stored thereon that are executable by a processor to cause the following steps:
   receiving, from a user, a plurality of search queries corresponding to a geographic area;
   receiving, from the user, a plurality of search refinements associated with the plurality of search queries, the search refinements resulting in the display of a plurality of refined results to the user and including an indication of a location within the geographic area;
   when the user refines the plurality of search results by selecting a same location in response to the plurality of search queries corresponding to the geographic area at least a predetermined amount which is more than once:
      mapping one of the plurality of search queries corresponding to the geographic area to a search query corresponding to the same location in the refined results;
      subsequent to mapping the search query corresponding to the geographic area to the search query corresponding to the same location, receiving, from the user, the one of the plurality of search queries mapped to one of the refined results; and
      in response to receiving the one of the plurality of search queries mapped to the search query corresponding to the same location, providing, for display to the user, refined content including an indication of the same location responsive to the search query corresponding to the same location.

* * * * *